United States Patent
Henneborn et al.

(10) Patent No.: US 6,564,827 B1
(45) Date of Patent: May 20, 2003

(54) SHUT-OFF DEVICE FOR THE FILLING DEVICE OF A PRESSURE TANK

(75) Inventors: Roland Henneborn, Pulheim (DE); Klaus Tocha, Langenfeld (DE)

(73) Assignee: Messer Griesheim GmbH, Frankfurt (DE)

(*) Notice: Subject to any disclaimer, the term of this patent is extended or adjusted under 35 U.S.C. 154(b) by 0 days.

(21) Appl. No.: 09/856,253

(22) PCT Filed: Nov. 4, 1999

(86) PCT No.: PCT/EP99/08418
§ 371 (c)(1), (2), (4) Date: Sep. 4, 2001

(87) PCT Pub. No.: WO00/31445
PCT Pub. Date: Jun. 2, 2000

(30) Foreign Application Priority Data

Nov. 20, 1998 (DE) .......................... 198 53 530

(51) Int. Cl.⁷ .......................... F16K 1/30; F17C 13/04
(52) U.S. Cl. .................. 137/514.7; 137/489.3; 137/614.2; 137/901; 251/120
(58) Field of Search .................. 137/467, 538, 137/488, 489, 489.3, 492, 492.5, 613, 514.5, 514.7, 540, 614.2, 901; 251/118, 120

(56) References Cited

U.S. PATENT DOCUMENTS

| | | | | |
|---|---|---|---|---|
| 799,203 A | * | 9/1905 | Swinny | 137/614.2 |
| 2,155,170 A | * | 4/1939 | Odend'hal | 137/489.3 |
| 2,646,066 A | * | 7/1953 | Nemetz | 137/614.2 |
| 2,882,922 A | * | 4/1959 | Schindel | 137/491 |
| 3,487,852 A | * | 1/1970 | Kikendall | 137/514.5 |
| 4,537,219 A | * | 8/1985 | Milish | 137/614.19 |
| 4,651,768 A | * | 3/1987 | Epe | 137/489.3 |
| 4,896,694 A | * | 1/1990 | Rausch | 251/120 |
| 5,067,520 A | * | 11/1991 | Kremer et al. | 137/614.2 |
| 5,673,563 A | * | 10/1997 | Albertson et al. | 62/56 |

FOREIGN PATENT DOCUMENTS

| | | | |
|---|---|---|---|
| DE | 18 07 308 U | * | 3/1960 |
| DE | 21 56 068 A | * | 5/1973 |
| DE | 33 14 905 A1 | * | 10/1984 |
| DE | 43 10 285 C1 | * | 8/1994 |
| EP | 0 846 901 A2 | * | 6/1998 |

OTHER PUBLICATIONS

Search report from EPO for the corresponding international application PCT/EP 99/08418.*
International Preliminary Examination report from EPO for the corresponding international application PCT/EP 99/08418.*

\* cited by examiner

Primary Examiner—Michael Powell Buiz
Assistant Examiner—Ramesh Krishnamurthy

(57) ABSTRACT

The invention relates to a shut-off apparatus for the charging device of a pressure vessel, especially for the storage of cryogenic liquefied gases, having a shut-off valve with a valve housing and a valve body stressed by a closure spring which, in order to charge the pressure vessel, can be brought into the open position against the force of the closure spring, having an apparatus for locking the valve body in the open position of the valve and having a release apparatus subjected to the action of the vessel pressure, which causes the apparatus to release the lock if a predetermined threshold vessel pressure is exceeded. According to the invention, the vessel threshold pressure at which closure of the charging device takes place can be preset with considerably more accuracy in that the release apparatus possesses a cylinder (1), a piston (2) and a piston rod (3), in that a medium-permeable annular gap is provided between piston (2) and cylinder (1), in that the piston rod (3) acts on the apparatus to release the lock, in that the cylinder (1) possesses an overflow valve (4, 12) on one side of the piston (2) which opens when the threshold vessel pressure is reached, in that, when the overflow valve (4, 12) is open, the cylinder (1) is in flow connection with the pressure vessel on one side of the piston (2) and is in flow connection with a reference pressure volume, preferably the ambient atmosphere, on the other side of the piston.

11 Claims, 1 Drawing Sheet

SHUT-OFF DEVICE FOR THE FILLING DEVICE OF A PRESSURE TANK

BACKGROUND OF THE INVENTION

The invention relates to a shut-off apparatus for the charging device of a pressure vessel, especially for the storage of cryogenic liquefied gases, having a shut-off valve with a valve housing and a valve body stressed by a closure spring which, in order to charge the pressure vessel, can be brought into the open position against the force of the closure spring, having an apparatus for locking the valve body in the open position of the valve and having a release apparatus subjected to the action of the vessel pressure, which causes the apparatus to release the lock if a predetermined threshold vessel pressure is exceeded.

An essential aspect of the design of shut-off apparatuses for the charging device of a pressure vessel is the reliable avoidance of excess pressures when charging the pressure vessels.

The shut-off apparatuses must first offer a maximum level of safety and secondly exclude as effectively as possible any manipulation or switching-off of the shut-off apparatuses. In particular, an independent control of the shut-off apparatus which is as isolated as possible from external influences must be guaranteed.

DE-OS 21 56 068 has disclosed a shut-off apparatus controlled by an independent medium for avoiding excess pressures in a gas or fluid line with a shut-off valve, in which the valve body is equipped with a resilient means in the form of a closure spring to generate a force in the closed position, an apparatus for locking being provided in the form of a locking lever and an assigned projection on the valve stem, this locking apparatus permitting the locking of the shut-off valve in the open position against the force acting towards the closed position, and this locking apparatus comprising release apparatuses for releasing the locking apparatus in the event that the pressure rises above or falls below a predetermined maximum or minimum pressure.

DE 196 50 560 A1 has likewise disclosed a shut-off apparatus for the charging device of a pressure vessel, in which the release apparatus possesses a bellows subjected to the vessel pressure with a switch rod attached thereto which pivots the locking apparatus of the valve body, designed as a closure lever, out of the locking position into the release position if vessel pressures exceed or fall below vessel threshold pressures.

In the known shut-off apparatuses for the charging device of a pressure vessel it is a problem, depending on the surroundings and the existing safety regulations, that the cryogenic gas is blown off during release and also after release. In some circumstances, the place of escape has to be moved by the costly piping of the gas into low hazard potential areas. It is also advantageous if the control line between the pressure vessel and the release apparatus possesses a narrow cross section —as is customary in signal lines.

SUMMARY OF THE INVENTION

Starting from this state of the art, therefore, the object of the invention is to provide a release apparatus for a shut-off apparatus which permits the release of the shut-off apparatus with little or no blow-off of the cryogenic gases conveyed.

The object derived and described above is achieved, according to the invention in that the release apparatus possesses a cylinder, a piston and a piston rod, in that a medium-permeable annular gap is provided between piston and cylinder, in that the piston rod acts on the apparatus to release the lock, in that the cylinder possesses an overflow valve on one side of the piston which opens when the threshold vessel pressure is reached, in that, when the overflow valve is open, the cylinder is in flow connection with the pressure vessel on one side of the piston and is in flow connection with a reference pressure volume, preferably the ambient atmosphere, on the other side of the piston.

With the improved release apparatus of the shut-off apparatus according to the invention, the release of the locking apparatus as a precisely reproducible step function is guaranteed in that the switching forces are abruptly boosted via a pneumatic booster at the start of the overflow valve opening operation, which can be precisely predetermined. In the shut-off apparatus according to the invention, this abrupt boost is guaranteed by simple pneumatic means and not by precision engineering with the disadvantages of costly production and adjustment. As soon as the overflow valve opens, a differential pressure arises across the annular gap between piston and cylinder and, by acting on the piston surface, guarantees a pneumatic force boost to release the shut-off apparatus.

As a result of the fact that, according to a first alternative embodiment of the shut-off apparatus according to the invention, an unobstructed control line opens into the cylinder on one side of the piston to create the flow connection to the pressure vessel and that the cylinder is connected to the overflow valve on the other side of the piston, the vessel pressure prevails in the entire cylinder when the overflow valve is shut. If the vessel pressure exceeds the vessel threshold pressure, the overflow valve opens, as a result of which, because of the relatively narrow annular gap, a lower pressure arises on the side of the piston opposite the control line than on the other side of the piston, which in turn results in the piston being subjected to a high force towards the side of the piston remote from the unobstructed control line to release the shut-off apparatus.

As an alternative to the embodiment of the shut-off apparatus according to the invention just described, a control line opens into the cylinder on one side of the piston via the overflow valve to create the flow connection to the pressure vessel and the cylinder is in unobstructed flow connection with the reference pressure volume on the other side of the piston. In this alternative version, the cylinder is under the pressure of the reference pressure volume when the overflow valve is shut. As soon as the overflow valve opens, in this alternative version, the pressure on the side of the piston facing the control line rises rapidly because of the narrow annular gap, so that the pressure difference between the two sides of the piston pneumatically boosts the opening of the overflow valve.

The effect is that, in both alternative versions, the embodiment according to the invention ensures that the piston rod of the release apparatus is abruptly accelerated at the moment when the overflow valve begins to open and thus acts on the apparatus by way of a single-step function to release the locking.

In order to bring about a defined initial state and to restore the release apparatus automatically when necessary, it is advantageous that, according to another embodiment of the invention, the piston rod is subjected to force via a spring towards the side of the piston facing the control line.

The second alternative embodiment of the release apparatus described is advantageously further developed in that the end of the piston rod facing the control line bears the sealing element of the over flow valve. This guarantees that the piston rod of the release apparatus, which is subjected to force, forms the overflow valve together with the sealing element and the valve seat arranged at one end of the cylinder. As a result, the number of components is reduced by comparison with an embodiment with a separate overflow valve.

If it is desired, in the case of the second alternative embodiment, that the release apparatus should not be restored automatically when the vessel pressure drops below the vessel threshold pressure, this can be guaranteed in that the cylinder and the piston on the side remote from the control line interrupt the flow connection to the reference pressure volume in the end position of the piston movement. As a result of the interruption of the flow connection to the reference pressure volume, the pressure in the cylinder is statically held at the vessel pressure, since the gas cannot flow out via the flow connection to the reference pressure volume. This static pressure difference then ensures that the piston cannot be restored automatically.

For controlled restoration, the shut-off apparatus according to the invention is further developed in that the cylinder is in flow connection with the reference pressure volume via a valve on the side facing the control line. Via such a valve, which may for example be manually actuated, it is possible to reduce the pressure on the side of the piston facing the control line to such an extent that a resetting of the piston and hence of the release apparatus becomes possible.

The two alternative embodiments of the release apparatus described are advantageous in that the control line does not require any large cross sections and in that little or no blow-off of the gases or media take place at the release apparatus. In particular, in the embodiment of the second alternative version, in which the flow connections to the reference pressure volume are interrupted by interaction of cylinder and piston, only a small quantity of gas or medium enters the reference pressure volume meaning, in particular, the environment.

There are many possible ways of embodying and developing the shut-off apparatus according to the invention for the charging device of a pressure vessel. In this connection, reference is made by ways of example first to the patent claims dependent on Patent claim 1 and secondly to the description of examples of embodiment of the shut-off apparatus according to the invention for the charging device of a pressure vessel in conjunction with the drawing. In the drawing:

DETAILED DESCRIPTION OF THE INVENTION

Figure 1:
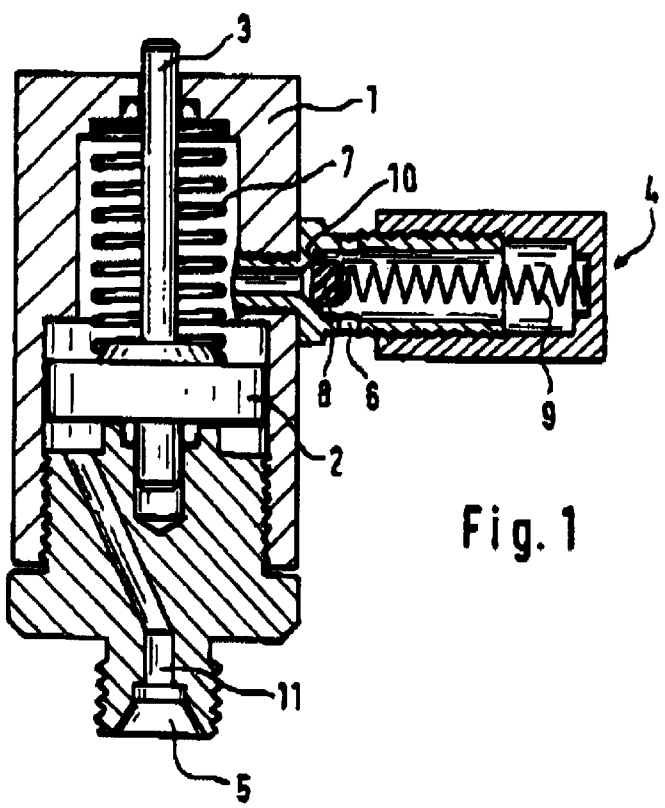
FIG. 1 shows a simplified sectional view of the essential components of a first example of embodiment of a shut-off apparatus according to the invention.
Figure 2:
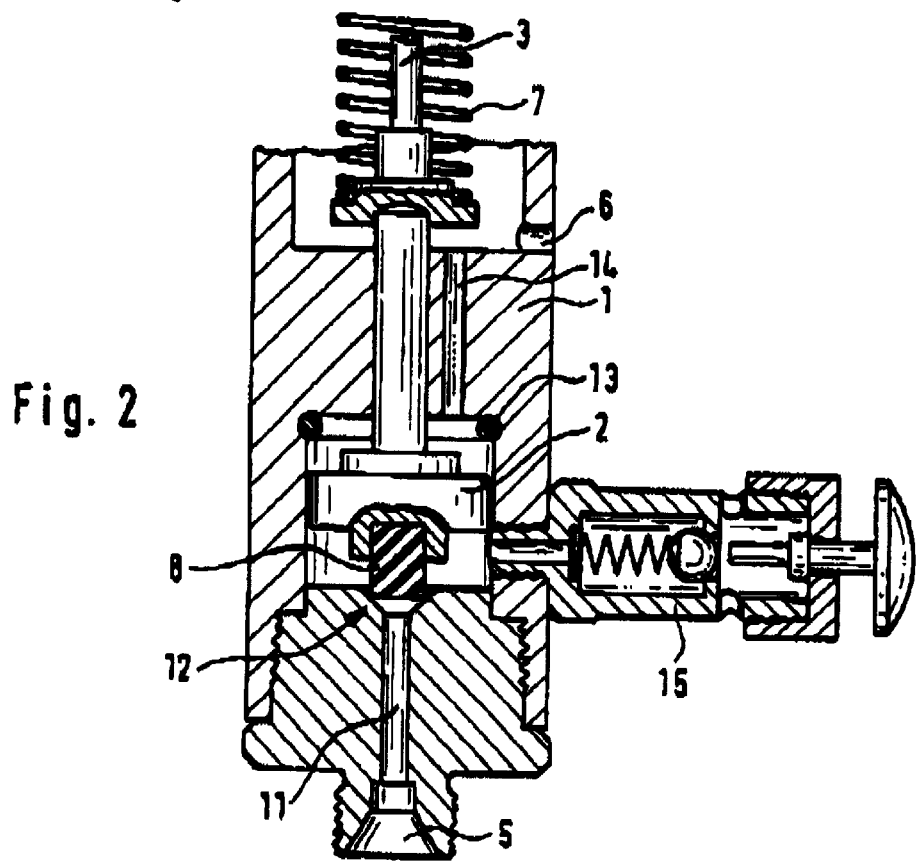
FIG. 2 shows a simplified sectional view of the essential components of a second example of embodiment of a shut-off apparatus according to the invention.

The illustration in FIGS. 1 and 2 does not give a complete view of the shut-off apparatus according to the invention for the charging device of a pressure vessel but shows only those components of a release apparatus subjected to the vessel pressure that causes the apparatus to release the locking when a predetermined vessel threshold pressure is exceeded that are essential to the invention.

The embodiment shown in FIG. 1, which is essential to the invention, of the release apparatus of the first example of embodiment possesses a cylinder 1, a piston 2 and a piston rod 3, a medium-permeable annular gap being provided between piston 2 and cylinder 1. The piston rod 3 acts on the apparatus (not shown) for releasing the locking. The cylinder 1 possesses an overflow valve 4 on one side of the piston 2 which opens when the vessel threshold pressure is reached. With the overflow valve 4 open, the cylinder 1 is in flow connection via a connector 5 on one side of the piston 2 with the pressure vessel (not shown) and is in flow connection via an outlet 6 with a reference pressure volume, in this case the ambient atmosphere, on the other side of the piston 2. To reset the piston 2, a spring 7 is provided between the cylinder 1 and the piston 2. To set the vessel threshold pressure, the sealing piece 8 of the overflow valve 4 is subjected to a force towards the valve seat 10 by a spring 9.

Located in the cylinder 1 is the piston 2 with a two-ended (continuous) piston rod 3. The piston 2 is not sealed off from the cylinder 1, in other words does not contact the cylinder inside wall, so that an annular slit exists between piston 2 and cylinder inside wall. The interior of the cylinder is connected to the pressure space, for example a cold gasifier. The two ends of the piston rod and all internals are sealed off in a gas-tight manner from the outside. The piston 2 is pressed downward by the spring 7 against a stop. The pressure prevailing in the cylinder 1 acts uniformly on both sides of the disc-shaped piston 2. The piston rod 3 also exerts no pressure-dependent forces. On the side of the piston 2 remote from an unobstructed control line 11 to create the flow connection to the pressure vessel (not shown), the interior of the cylinder is connected to a spring-loaded overflow valve 4. This overflow valve 4 opens when the shut-off apparatus according to the invention reaches the desired, set vessel threshold pressure. When the overflow valve 4 opens, a generally gaseous medium is drawn from the corresponding part of the cylinder. A differential pressure arises across the annular gap between the cylinder 1 and the piston 2, resulting in a compressive force which leads to spontaneous raising of the piston 2. The piston rod 3 then actuates, in a manner known per se (of for example DE 196 50 560 A1) an apparatus for locking the valve body, so that a shut-off valve is closed.

As soon as the pressure in the cylinder 1 falls to the point where the overflow valve 4 closes again, a compensated pressure exists throughout the cylinder 1 after a short interval. The spring 7 than pushes the piston 2 back into the starting position, so that the release apparatus again allows the locking of the shut-off valve (not shown) in the open position.

By miniaturization of the overflow valve 4, the quantity of gas blown out during each release operation is kept very low despite high release forces.

In the example of embodiment shown in FIG. 2, the components performing the same functions are given the same reference numbers.

In the example of embodiment shown in FIG. 2, the pressure space of a cold gasifier (not shown) is connected via the control line 11 to a spring-loaded overflow valve 12. A sealing element 8 on the piston 2 closes the control line 11 in a gas-tight manner. Atmospheric pressure therefore prevails above the overflow valve 11. The overflow valve 12 is set, via the spring 7, so that the start of opening (stroke) corresponds to the desired switching pressure.

With this opening operation, gas flows past the sealing element 8 and generates a compressive force on the large surface of the unsealed piston 2 which results in the spontaneous lifting movement of the piston 2 and hence of the piston rod 3. As a result, the apparatus (not shown) for locking the valve body in the open position of the shut-off valve is actuated. In the upper piston end position in FIG. 2, the piston 2 lies on a sealing ring 13, so that a continuous outflow of gas through the secondary bore 14 and the outlet 6 is prevented.

If the piston lies on the sealing ring 13 in the piston end position, the container pressure acts without flow, in other words statically, on the piston 2. No gas losses occur. The release apparatus remains in this position on condition that the vessel pressure does not fall substantially. In other words, the release apparatus is not automatically reset. If a laterally affixed sensor valve 15 is now actuated manually, the cylinder 1 is relieved of pressure on the side of the piston 2 facing the control line 11. As a result, the compressive force on the piston 2 is reduced to the point where the piston 2 moves, under spring load, into the closed position of the overflow valve 12. The outflow process from the manually actuated sensor valve 15 is thus automatically ended.

In the example of embodiment shown in FIG. 2, the static pressure is almost exclusively sufficient for release, which is equivalent to saying that, after the release, no undesired outflow of the stored medium takes place.

What is claimed is:

1. Shut-off apparatus for the charging device of a pressure vessel, especially for the storage of cryogenic liquefied gases, having a shut-off valve with a valve housing and a valve body stressed by a closure spring which, in order to charge the pressure vessel, can be brought into the open position against the force of the closure spring, having a release apparatus subjected to the action of the vessel pressure, which causes the apparatus to release a lock if a predetermined threshold vessel pressure is exceeded, characterized in that the release apparatus possesses a cylinder (1), a piston (2) and a piston rod (3), in that a medium-permeable annular gap is provided between piston (2) and cylinder (1), in that the piston rod (3) acts on the apparatus to release the lock, in that the cylinder (1) possesses an overflow valve (4, 12) on one side of the piston (2) which opens when the threshold vessel pressure is reached, in that, when the overflow valve (4, 12) is open, the cylinder (1) is in flow connection with the pressure vessel on one side of the piston (2) and is in flow connection with a reference pressure volume, preferably the ambient atmosphere, on the other side of the piston.

2. Shut-off apparatus according to claim 1, characterized in that an unobstructed control line (11) opens in the cylinder (1), on one side of the piston (2), to create the flow connection to the pressure vessel and in that the cylinder (1) is connected to the overflow valve (4) on the other side of the piston (2).

3. Shut-off apparatus according to claim 1, characterized in that a control line (11) opens in the cylinder (1) on one side of the piston (2) via the overflow valve (12) to create the flow connection to the pressure vessel and in that the cylinder (1) is in unobstructed flow connection with the reference pressure volume on the other side of the piston (2).

4. Shut-off apparatus according to claim 3, characterized in that the piston rod is subjected to force via a spring towards the side of the piston facing the control line.

5. Shut-off apparatus according to claim 4, characterized in that the end of the piston rod facing the control line bears the sealing element of the overflow valve.

6. Shut-off apparatus according to claim 5, characterized in that the cylinder and the piston interrupt the flow connection to the reference pressure volume on the side remote from the control line in the end position of the piston movement away from the control line.

7. Shut-off apparatus according to claim 6, characterized in that the cylinder can be flow-connected to the reference pressure volume via a valve on the side facing the control line.

8. Shut-off apparatus according to claim 1, characterized in that the piston rod is subjected to force via a spring towards the side of the piston facing the control line.

9. Shut-off apparatus according to claim 3, characterized in that the end of the piston rod facing the control line bears the sealing element of the overflow valve.

10. Shut-off apparatus according to claim 3, characterized in that the cylinder and the piston interrupt the flow connection to the reference pressure volume on the side remote from the control line in the end position of the piston movement away from the control line.

11. Shut-off apparatus according to claim 3, characterized in that the cylinder can be flow-connected to the reference pressure volume via a valve on the side facing the control line.

* * * * *